United States Patent
Mazzola et al.

(10) Patent No.: US 9,100,313 B1
(45) Date of Patent: Aug. 4, 2015

(54) SHARED EGRESS BUFFER IN A MULTI-STAGE SWITCH

(71) Applicant: Cisco Technology, Inc., San Jose, CA (US)

(72) Inventors: Mario Mazzola, San Jose, CA (US);
Luca Cafiero, Palo Alto, CA (US);
Francis Matus, Saratoga, CA (US);
Georges Akis, Los Altos, CA (US);
Peter Newman, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 204 days.

(21) Appl. No.: 13/709,537

(22) Filed: Dec. 10, 2012

(51) Int. Cl.
*H04L 12/933* (2013.01)
*H04L 12/947* (2013.01)
*H04L 12/931* (2013.01)

(52) U.S. Cl.
CPC .............. *H04L 49/101* (2013.01); *H04L 49/25* (2013.01); *H04L 49/50* (2013.01)

(58) Field of Classification Search
CPC ...... H04Q 3/004; H04L 49/15; H04L 49/101; H04L 49/90; H04L 12/5694; H04L 65/102; H04L 12/254; H04L 12/5689; H04L 47/17; H04L 47/10; H04L 49/25; H04L 49/30; H04L 47/12; H04L 49/10; H04L 49/253; H04L 47/50; H04L 47/00
USPC .................................. 370/412–417, 351–388
See application file for complete search history.

(56) References Cited

U.S. PATENT DOCUMENTS

| | | | | |
|---|---|---|---|---|
| 4,625,306 A * | 11/1986 | Newman | ......................... | 370/422 |
| 4,965,788 A | 10/1990 | Newman | | |
| 5,859,849 A * | 1/1999 | Parks | ........................ | 370/395.72 |
| 6,643,256 B1 * | 11/2003 | Shimojo et al. | ............... | 370/229 |
| 6,754,205 B1 * | 6/2004 | Sakaue | ......................... | 370/360 |
| 7,680,097 B1 * | 3/2010 | Goldstein et al. | ............. | 370/351 |
| 7,830,793 B2 | 11/2010 | Gai et al. | | |
| 7,996,485 B2 * | 8/2011 | Brown | ......................... | 709/213 |
| 2002/0181481 A1 * | 12/2002 | Iny | ............................... | 370/412 |
| 2003/0123468 A1 * | 7/2003 | Nong | ............................ | 370/412 |
| 2007/0121499 A1 * | 5/2007 | Pal et al. | ....................... | 370/230 |
| 2010/0232449 A1 * | 9/2010 | Nielsen | ......................... | 370/416 |
| 2013/0329577 A1 * | 12/2013 | Suzuki et al. | ................. | 370/252 |

* cited by examiner

*Primary Examiner* — Warner Wong
(74) *Attorney, Agent, or Firm* — Edell, Shapiro & Finnan, LLC (57) ABSTRACT

A multi-stage network switch comprises a plurality of ingress port subsystems each comprising one or more ingress ports configured to receive packets. The switch also comprises a plurality of unscheduled crossbar switching elements connected to the ingress port subsystems that are configured to receive one or more packets from at least one of the ingress port subsystems. The switch further comprises a plurality of egress port subsystems each comprising a memory and a plurality of egress ports. The memory comprises at least one shared egress buffer configured to receive any packets forwarded by the crossbar switching elements from the ingress port subsystems directed to the egress port subsystem, and the egress ports are configured to transmit the packets received in the shared egress buffer.

18 Claims, 5 Drawing Sheets

SHARED EGRESS BUFFER IN A MULTI-STAGE SWITCH

TECHNICAL FIELD

The present disclosure relates to latency in a multi-stage switch.

BACKGROUND

In a computing network, data is transmitted from a source to a destination in the form of packets that generally pass through one or more networking devices (e.g., switches, routers, firewalls, etc.). These networking devices may perform one or more operations that introduce latency into the packet transmission process. Latency may be measured as the time between the arrival of a first bit of a packet (i.e., the packet head) at an ingress port and the departure of the first bit of the packet from an egress port. That is, latency of a networking device is the difference between the arrival time and the departure time of a packet.

DESCRIPTION OF EXAMPLE EMBODIMENTS

Overview

A multi-stage network switch comprises a plurality of ingress port subsystems each comprising one or more ingress ports configured to receive packets. The switch also comprises a plurality of unscheduled crossbar switching elements connected to the ingress port subsystems that are configured to receive one or more packets from at least one of the ingress port subsystems. The switch further comprises a plurality of egress port subsystems each comprising a memory and a plurality of egress ports. The memory comprises at least one shared egress buffer configured to receive any packets forwarded by the crossbar switching elements from the ingress port subsystems directed to the egress port subsystem, and the egress ports are configured to transmit the packets received in the shared egress buffer.

Example Embodiments

Low-latency networking has recently become of concern to users and network administrators, particularly as a result of the growth of large data centers and high-speed trading applications. However, there is a conflict between low-latency and high capacity in network switch design. In general, low-latency is possible to achieve in lower-throughput (lower capacity) switches having simpler architectures, but low-latency becomes much more difficult to achieve in the design of higher-throughput (higher capacity) switches that use more complex switch architectures. Presented herein are multi-stage low or high capacity network switches that use an unscheduled crossbar switching fabric and a shared egress buffer to achieve low-latency.

Figure 1:
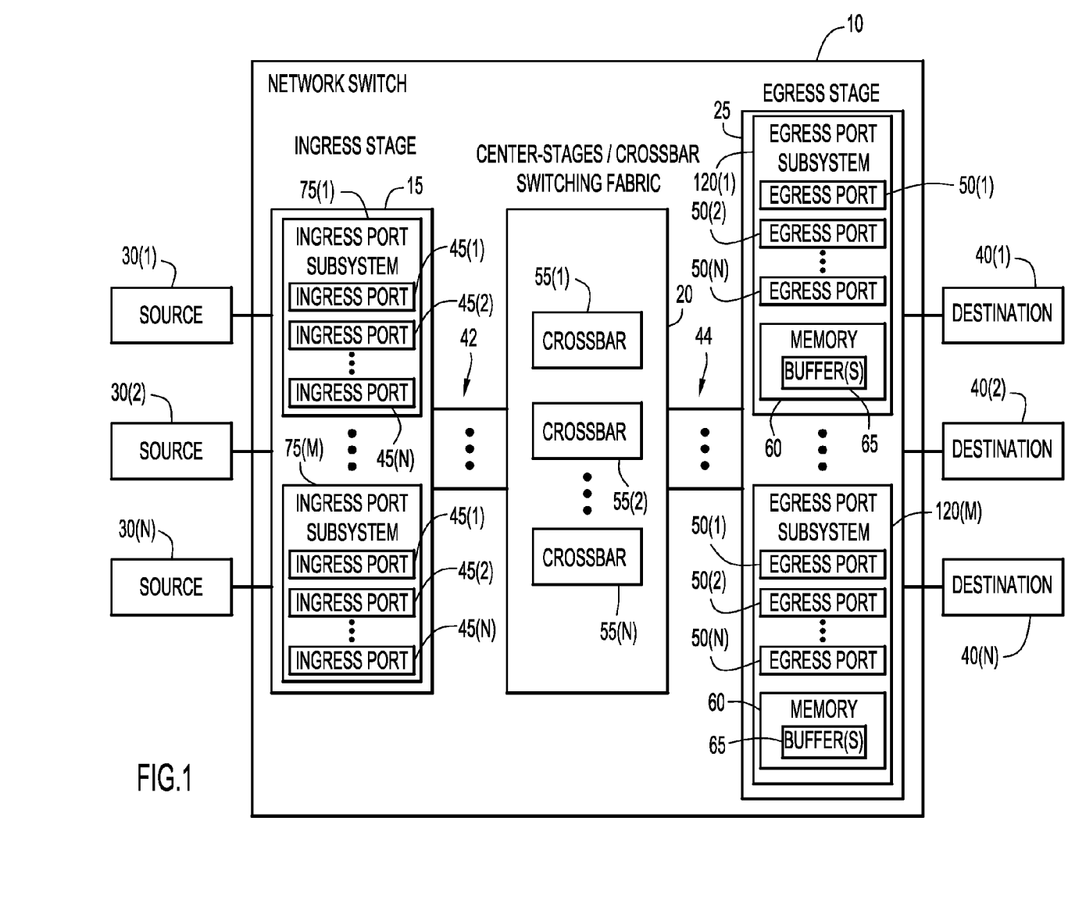
FIG. 1 is a block diagram of a network switch in accordance with examples presented herein.

FIG. 1 is a block diagram of a network switch 10 in accordance with examples presented herein. Switch 10 comprises an ingress stage 15, one or more center stages 20 forming a switching fabric, and an egress stage 25. In general, switch 10 is configured to forward packets received from sources (e.g., source devices) 30(1)-30(N) to destinations (e.g., destination devices) 40(1)-40(N). Network switch 10 may be directly or indirectly connected (i.e., via one or other networking devices) to sources 30(1)-30(N) and/or destinations 40(1)-40(N).

As shown, ingress stage 15 includes a plurality of ingress port subsystems 75(1)-75(M). Each ingress port subsystem 75(1)-75(M) comprises a plurality of network interface ports 45(1)-45(N). For ease of description, the network interface ports 45(1)-45(N) are referred to herein as ingress ports 45(1)-45(N).

Egress stage 25 includes a plurality of egress port subsystems 120(1)-120(M). Each egress port subsystem 120(1)-120(M) comprises a plurality of network interface ports 50(1)-50(N). For ease of description, network interface ports 50(1)-50(N) are referred to herein as egress ports 50(1)-50(N). In the example of FIG. 1, each egress port subsystem 120(1)-120(M) also comprises a shared memory 60 that includes one or more shared egress buffers 65.

Each center stage 20 comprises a plurality of unscheduled crossbar switching elements 55(1)-55(N) that, for ease of description, are referred to herein as crossbars 55(1)-55(N). Crossbars 55(1)-55(N) collectively provide an unscheduled crossbar switching fabric 20.

Ingress stage 15 is connected to the crossbar switching fabric 20 via one or more uplinks 42, while crossbar switching fabric 20 is connected to egress stage 25 via one or more downlinks 44. Both uplinks 42 and downlinks 44 include one or more channels, where a single channel can carry a single packet transmission at the fabric rate. The number of channels on the downlinks 44 may differ from the number of channels on the uplinks 42. In general, the combined bandwidth of the uplinks 42 exceeds the combined bandwidth of the ingress ports 45(1)-45(N). In one example, to reduce the probability of packet collisions in the crossbar switching fabric 20, there may be twice as many channels on the downlinks 44 as on the uplinks 42.

Conventional switch designs having a crossbar switching fabric typically include a central scheduler that coordinates access to the crossbar switching fabric. The scheduler is notified of packet arrivals through a scheduler messaging mechanism internal to the switch. This scheduler messaging mechanism is also used by the scheduler to return "grants" for access to the crossbar. The use of this scheduler messaging mechanism creates a messaging loop that increases the switch latency, even when the switch is very lightly loaded.

The crossbar switching fabric 20 is an "unscheduled" switching fabric because use of the central scheduler to control access to the crossbar is eliminated. As such, packets received at ingress stage 15 do not need to wait for permission (through the scheduler messaging mechanism) to be sent across the crossbar switching fabric 20. Instead, the packets access a crossbar 55(1)-55(N) as soon as an uplink channel becomes available. As described further below, message-based feedback is used to inform a sending ingress port subsystem 75(1)-75(M) of collisions in a crossbar 55(1)-55(N) so that the sender can retransmit a packet that suffered a collision.

The unscheduled crossbar switching fabric 20 described above is, in the examples presented herein, combined with an egress stage 25 that is a shared-memory switching fabric. More particularly, each egress port subsystem 120(1)-120(M) includes a shared memory 60 having one or more shared egress buffers 65 configured to buffer packets received from crossbar switching fabric 20. In other words, all packets that exit the crossbar switching fabric 20 that are directed to an egress port of an egress port subsystem are accepted by the one or more egress buffers 65 in that egress port subsystem. This is in contrast to conventional switch designs that employ a crossbar switching fabric in the egress stage (that is similar to the second stage) where packet collisions could occur. In such conventional designs, all packets generally cannot be accepted into the egress stage and negative acknowledgement messages are issued by the egress stage when a packet is not accepted. By using shared buffers 65 in the egress stage 25, the number of acceptance failures is greatly reduced or substantially eliminated. In addition, because, as noted above, the aggregate bandwidth of the downlinks 44 can exceed the uplinks 42, the probability of packet collisions is also reduced. The use of the shared buffers 65 in the egress stage 25 achieves high performance, yet retains the low-latency characteristic of an unscheduled switching fabric.

Figure 2:
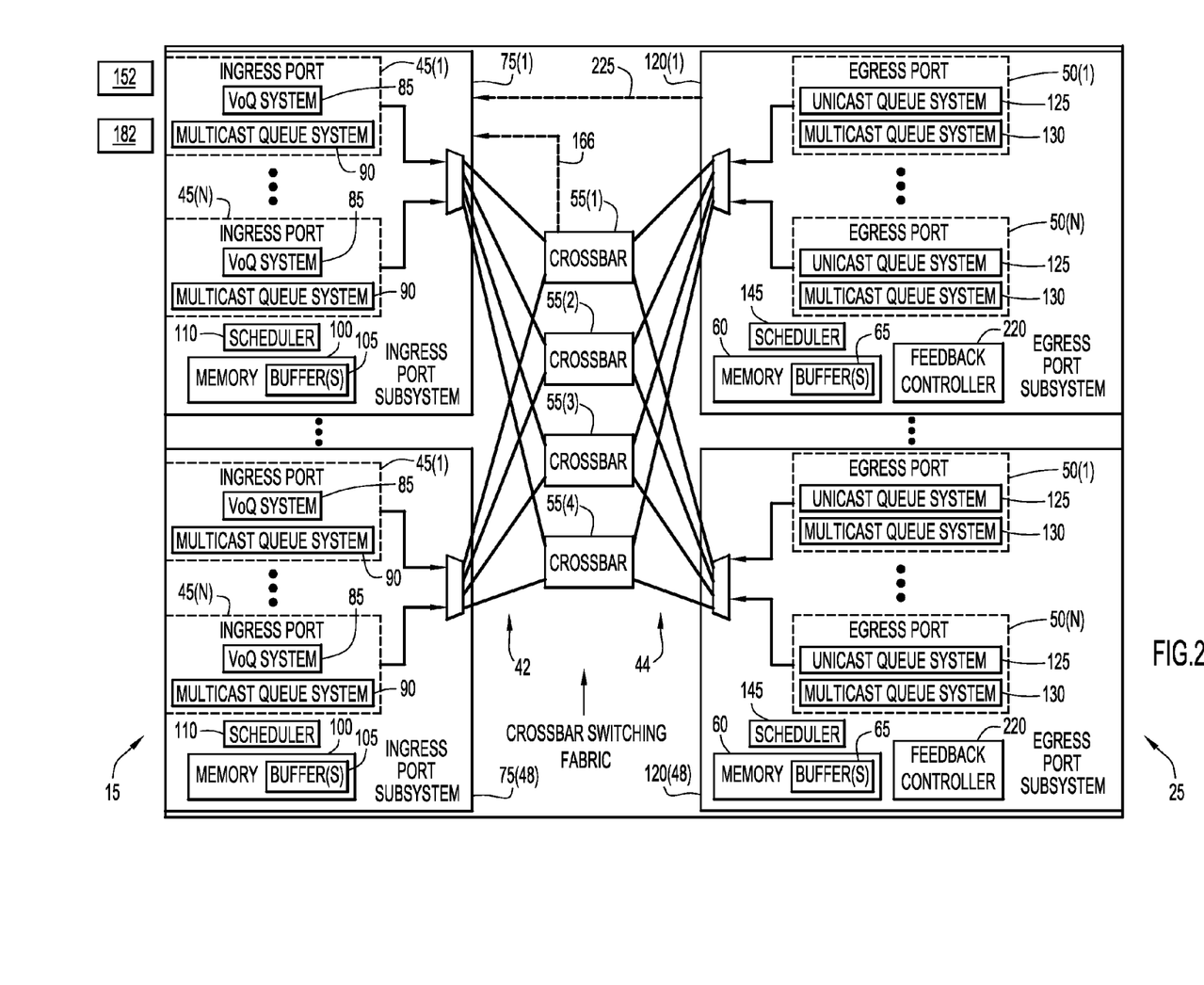
FIG. 2 is a schematic diagram illustrating further details of a network switch in accordance with examples presented herein.

FIG. 2 is a schematic diagram illustrating further details of one example of FIG. 1 in which crossbar switching fabric 20 includes one stage that connects ingress stage 15 to egress stage 25. As such, in this example, switch 10 is a three stage switch. Although FIG. 2 illustrates a three-stage switch, it is to be appreciated that the techniques presented herein scale for use in switch implementations having larger switching fabrics (e.g., three center stages) while still offering low latency.

FIG. 2 illustrates a specific implementation in which forty-eight (48) ingress port subsystems 75(1)-75(48) are provided. As noted, ingress port subsystems 75(1)-75(48) each include a plurality of ingress ports 45(1)-45(N) to receive packet traffic.

Unicast and multicast packets use separate queuing systems because of their different handling requirements (i.e., unicast packets use virtual output queues to prevent head-of-line blocking while multicast packets are hashed into a set of multicast queues). As such, each ingress port 45(1)-45(N) in an ingress port subsystem includes or is associated with a virtual output queue (VoQ) system 85. The VoQ systems 85 comprise a plurality of queues for use with unicast packets received at the associated ingress port. Additionally, each ingress port 45(1)-45(N) of each ingress port subsystem 75(1)-75(48) also includes or is associated with a multicast queue system 90. Each multicast queue system 90 comprises a plurality of queues for use with multicast packets received at the associated ingress port. For ease of illustration, the individual queues within VoQ system 85 and multicast queue system 90 have not been shown in FIG. 2.

Each ingress port subsystem 75(1)-75(48) also includes a scheduler 110 and a memory 100. Memory 100 includes one or more buffers 105. In one example, ingress port subsystems 75(1)-75(48) may be implemented in one or more application-specific integrated circuits (ASICs).

As is well known, a queue is a linked-list of packet pointers for packets scheduled for transmission. Since networking devices offer different classes of service, there may be different queues independently scheduled for the same port. For example, a VoQ system 85 may include one queue for each traffic class of each egress port in the switch 10. In another example, each ingress port may include eight (8) queues of unicast packets and eight (8) queues of multicast packets.

In contrast to queues, a buffer is a memory location where the packets (linked to the queues) are actually stored. That is, the buffer refers to a section of memory that stores packets, while queues are just a linked-list of pointers to the packets in the buffer.

FIG. 2 illustrates a specific implementation in which forty-eight (48) egress port subsystems 120(1)-120(48) are provided. As noted, egress port subsystems 120(1)-120(48) each include a plurality of egress ports 50(1)-50(N) to transmit packet traffic.

As noted, unicast and multicast packets use separate queuing systems because of their different handling requirements. As such, each egress port 50(1)-50(N) in an egress port subsystem includes or is associated with a unicast queue system 125 that comprises a plurality of queues for use with unicast packets. Each egress port 50(1)-50(N) in an egress port subsystem also includes or is associated with a multicast queue system 130 that comprises a plurality of queues for use with multicast packets. In the unicast queue system 125, there may be one queue for each traffic class of the associated egress port. For ease of illustration, the individual queues within unicast queue system 125 and multicast queue system 130 have not been shown in FIG. 2.

Each egress port subsystem 120(1)-120(48) also includes a shared memory 60. As noted above, the memory 60 in each egress port subsystem 120(1)-120(48) also includes one or more shared egress buffer(s) 65. Each egress port subsystem 120(1)-120(48) also comprises a scheduler 145. In one example, egress port subsystems 120(1)-120(48) may be implemented in one or more ASICs.

The crossbar switching fabric 20 comprises four unbuffered crossbars 55(1), 55(2), 55(3), and 55(4). Each of the ingress port subsystems 75(1)-75(48) in the ingress stage 15 is connected by an uplink 42 to each crossbar 55(1)-55(4). Each of the crossbars 55(1)-55(4) is connected by a downlink 44 to every egress port subsystem 120(1)-120(48) in the egress stage 25.

As noted, a queue is a linked-list of packet pointers of packets scheduled for transmission, while a buffer is a memory location where the packets (linked to the queues) are actually stored. In the example of FIG. 2, the egress buffers 65 in each memory 60 are "shared" because multiple queues in an associated egress port subsystem are linked to the egress buffers 65. That is, for example, multiple queues in the egress ports 50(1)-50(N) of egress port subsystem 120(1) may be linked to the shared egress buffer 65 in egress port subsystem 120(1). The shared memory 60 in egress port subsystem 120(1) may, in one example, be a large section of memory that is linked to all the queues in the associated egress port subsystem 120(1). In certain such examples, the memory 60 and egress buffers 65 may be logically divided between the various egress ports 50(1)-50(N) within the associated egress port subsystem 120(1)), queues, etc. That is, artificial boundaries may be created within the memory 60 so that different egress ports or queues each have their own section of a buffer. However, it is to be noted that shared memory 60 is configured such that the entire bandwidth of arrivals at an egress port subsystem, such as egress port subsystem 120(1), can be directed towards one single egress port 50(1)-50(N) of that egress port subsystem. That is, for example, there may be sixteen (16) wires coming from the center stage 20, each wire operating at 10 Gigabits per second (Gbs), referred to as 10 G channels. This results in a total of 160 G that can be transmitted from the center stage 20 to an egress port subsystem at any one time. The arrangement of the egress port subsystems enables this entire bandwidth (i.e., all 160 G) to be directed entirely to one egress port. This is distinct from a conventional switch that does not include shared memories 60 and shared egress buffers 65 and thus can only enable a discrete portion (e.g., 10 G) of the bandwidth to be directed to any one port, thereby resulting in a significant amount (e.g., 150 G in the above example) of data that will be dropped.

It is to be appreciated that the example of FIG. 2 is merely illustrative and that the various elements may have different arrangements in alternative examples.

Figure 3:
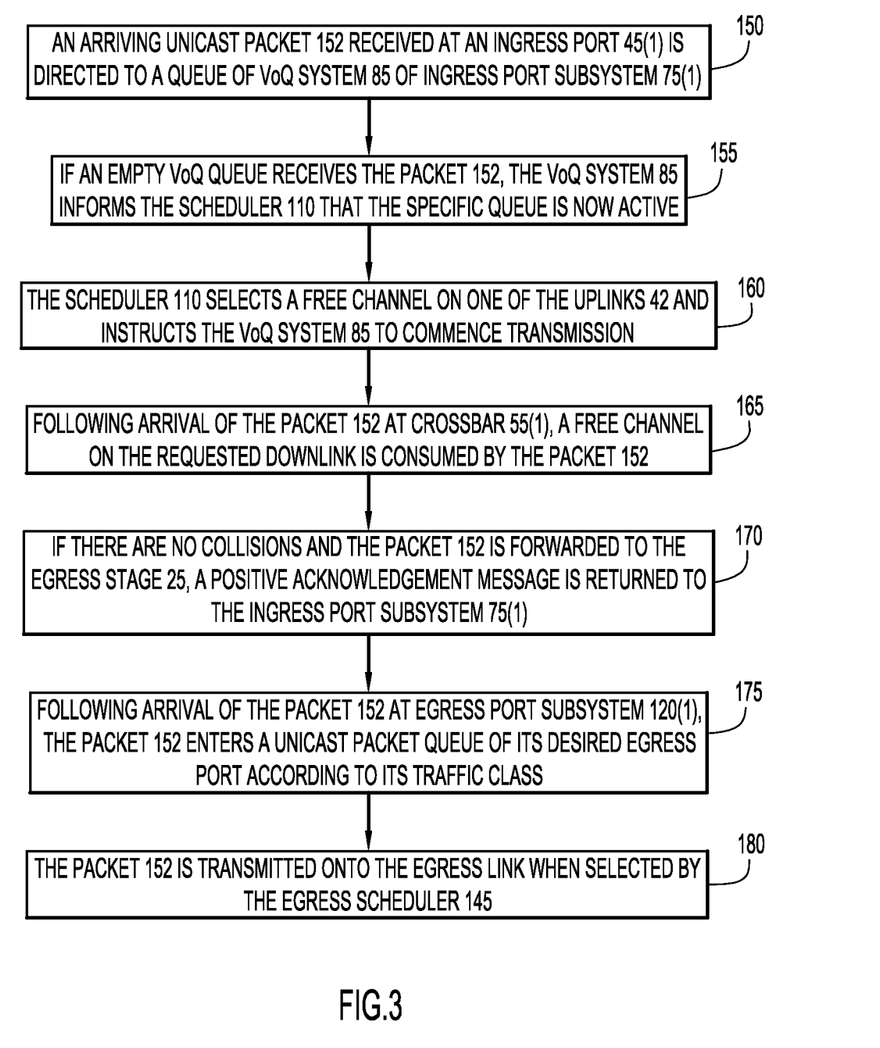
FIG. 3 is a flowchart illustrating the flow of a unicast packet through a network switch in accordance with examples presented herein.

FIG. 3 is a flowchart illustrating the flow of a unicast packet through switch 10 of FIG. 2. In the example of FIG. 3, at 150 an arriving unicast packet 152 received at ingress port 45(1) of egress port subsystem 75(1) is directed to a queue (indicated by the packet's associated egress port and traffic class) of VoQ system 85 in ingress port 45(1).

At 155, if VoQ queue that receives the packet 152 is empty, the VoQ system 85 informs the scheduler 110 that the specific queue is now active. If a receiving VoQ queue is not empty, the scheduler 110 is already aware that the queue is active and this step is omitted. At 160, the scheduler 110 selects a free channel on one of the uplinks 42 and instructs the VoQ system 85 to commence transmission. In other words, the scheduler 110 matches free uplink channels to active queues. In certain examples, the scheduler 110 is configured to randomly select the uplink 42 to be used for transmission of packet 152 from a set of uplinks 42 that have at least one available channel.

At 165, following arrival of the packet 152 at a crossbar, such as crossbar 55(1), a free channel on the requested downlink is consumed by the packet 152. At 170, if there are no collisions and the packet 152 is forwarded to the egress stage 25, a positive acknowledgement message is returned to the ingress port subsystem 75(1). Alternatively, if no free channel is available on the requested downlink or a collision with another packet otherwise occurs, a negative acknowledgement message is returned to ingress port subsystem 75(1) and the arriving packet 152 is discarded by the crossbar switching fabric 20.

Additionally, the crossbars 55(1)-55(4) may each impose a limit on the maximum number of packets that can be simultaneously transmitted to any single third-stage egress port. If a packet arriving at a crossbar 55(1)-55(4) would cause this limit to be exceeded, the negative acknowledgement is returned and the arriving packet is discarded even though a free channel is available on the downlink. The positive and negative acknowledgement messages are collectively identified in FIG. 2 by reference number 166.

At 175, following arrival of the packet 152 at egress port subsystem 120(1), the packet 152 enters a unicast packet queue of its desired egress port according to its traffic class (i.e., a designated queue in unicast queue system 125 of an egress port, such as egress port 50(1) of egress port subsystem 120(1)). At 180, the packet 152 is transmitted onto the egress link when selected by the egress scheduler 145.

In certain examples, the queues in the switch 10 operate in cut-through mode. That is, if the associated egress port 50(1)-50(N) is idle when the packet begins to arrive, then the egress port immediately commences transmission. As such, the head of a packet may leave an egress port of the switch 10 while the tail of that packet is still arriving at the ingress port.

When the ingress port subsystem 75(1) receives an acknowledgement message 166 indicating that a packet transmitted thereby has successfully passed the crossbar 55(1), the ingress port subsystem 75(1) can dequeue and discard the packet 152 immediately (if it has already finished transmission) or upon completion of transmission. If, however, a negative acknowledgement message 166 is received form crossbar 55(1), the ingress port subsystem 75(1) retransmits the packet 152. In certain examples, the ingress port subsystem 75(1) will attempt to retransmit the packet 152 across a different crossbar 55(2)-55(4) than the one (crossbar 55(1)) that issued the most recent negative acknowledgment. The ingress port subsystem 75(1), more particularly scheduler 110, may select the different center stage crossbar at random or based on information received from the crossbar switching fabric 20. If no such alternative crossbar 55(2)-50(4) is available, then the ingress port subsystem 75(1) may attempt to retransmit the packet across the same crossbar 55(1). In other words, during retransmission of packet 182, the crossbar from which the most recent negative acknowledgement was received is excluded, unless that crossbar is the only available switching element. This improves performance by redirecting traffic to crossbars less likely to be unavailable.

Figure 4:
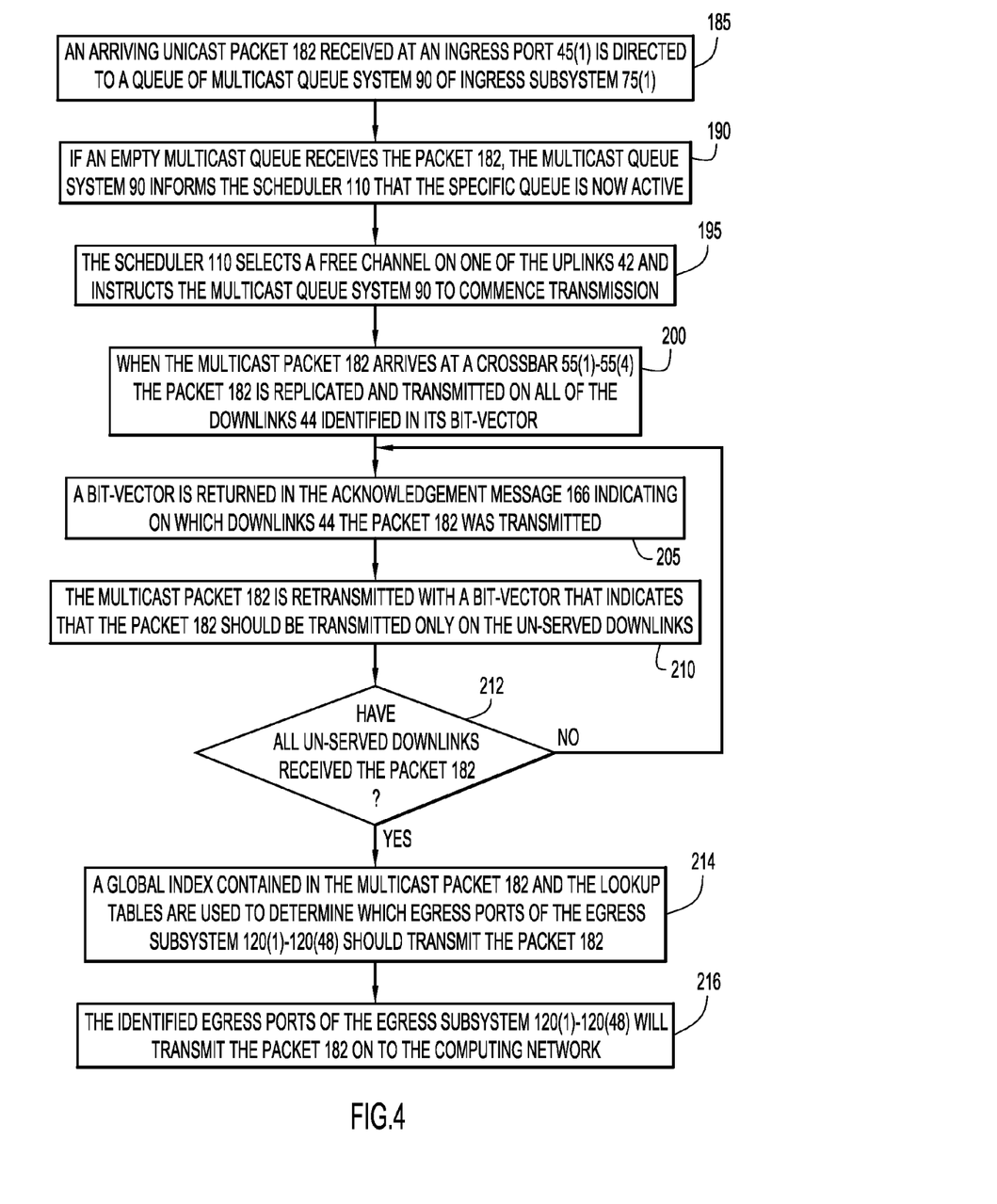
FIG. 4 is a flowchart illustrating the flow of a multicast packet through a network switch in accordance with examples presented herein.

As noted, FIG. 3 illustrates the flow of a unicast packet through the switch 10. However, as noted above, the crossbar switching fabric 20 also supports multicast traffic. FIG. 4 illustrates the flow of a multicast packet 182 through the switch 10 of FIG. 2.

In the example of FIG. 4, at 185 an arriving unicast packet 182 received at an ingress port 45(1) of ingress port subsystem 75(1) is directed to a queue (indicated by the packet's associated egress and traffic class) of multicast queue system 90 of ingress port 45(1). At 190, if the multicast queue that receives the packet 182 is empty, the multicast queue system 90 informs the scheduler 110 that the specific queue is now active. If a receiving multicast queue is not empty, the scheduler 110 is already aware that the queue is active and this step is omitted. At 195, the scheduler 110 selects a free channel on one of the uplinks 42 and instructs the multicast queue system 90 to commence transmission. In other words, the scheduler 110 matches free uplink channels to active queues. In certain examples, the scheduler 110 is configured to randomly select the uplink 42 to be used for transmission of packet 182 from a set of uplinks 42 that have at least one available channel.

A multicast packet 182 contains a bit-vector indicating the set of downlinks 44 on which it is to be replicated and transmitted. At 200, when the multicast packet 182 arrives at a crossbar 55(1)-55(4), such as crossbar 55(1), the packet 182 is replicated and transmitted on all of the downlinks 44 requested/identified in its bit-vector. In certain examples, no free channel may be available on some of the downlinks 44 requested in the bit-vector. In this case, the multicast packet 182 is replicated and transmitted only on those downlinks 44 that have channels available. In either case, at 205, a bit-vector is returned in the acknowledgement message 166 indicating on which downlinks 44 the packet 182 was transmitted.

If the multicast packet 182 was not successfully transmitted on all requested downlinks 44, the acknowledgement message 166 is used by the transmitting ingress port subsystem 75(1) to determine the downlinks on which the multicast packet 182 was not transmitted, referred to herein as un-served downlinks. At 210, the multicast packet 182 is retransmitted with a bit-vector that indicates that the packet 182 should be transmitted only on the un-served downlinks. As shown at 212, this process is repeated until all requested downlinks have received a copy of the multicast packet 182.

Only one copy of a multicast packet 182 is received at any egress port subsystem 120(1)-120(48). The egress port subsystems 120(1)-120(48) each include a lookup table. At 214, a global index contained in the multicast packet 182 and the lookup tables are used to determine which egress ports of the egress port subsystem 120(1)-120(48) should transmit the packet 182. At 216, the identified egress ports of the egress port subsystem 120(1)-120(48) will transmit the packet 182.

While the shared memories 60 in each of the egress port subsystems 120(1)-120(48) provide buffering, there may be, at certain times, a significant amount of data arriving at the egress stage 25. To prevent packet loss at the egress stage 25, each egress port subsystem 120(1)-120(48) includes a feedback controller 220 to transmit a feedback signal 225 (FIG. 2) from the egress stage 25 to ingress stage 15 in the event the egress buffers 65 become substantially filled. In certain examples, the feedback controller 220 is an on/off (Xon/Xoff) feedback control loop.

More specifically, when the feedback controller 220 determines that the one or more egress buffers 65 are substantially full, the feedback controller 220 will transmit an Xoff feedback signal 225. This Xoff feedback signal 225 informs the ingress stage 15 that it should cease transmission of traffic to a specified egress port on a specified traffic class.

After receipt of the Xoff feedback signal 225 by the egress stage 25, there will be a period of time before the ingress stage 15 processes the signal 220 and stops the transmission of traffic to the egress stage 25. During this time period, some additional in-flight traffic, such as packets that were already in transmission at the time of the transmission of the Xoff feedback signal 220, may still be received at the egress buffers 65. As such, the feedback controller 220 is configured to transmit the Xoff feedback signal 225 while there is still sufficient buffer space to accept/absorb any packets received during this time period. The amount of buffer space required to absorb the in-flight traffic may depend on the maximum arrival rate. In certain embodiments, the maximum arrival rate to a single egress port may be constrained in order to limit the amount of buffer space required for in-flight absorption.

After a period of time, egress buffers 65 will empty to a point that they can again accept traffic. At this time, the feedback controller 220 will transmit an Xon feedback signal 225. The Xon feedback signal 225 informs the egress stage 15 that it should re-commence transmission of traffic to the specified egress port on the specified traffic class.

Because packets received at egress buffers 65 may be transmitted from any ingress port subsystem 75(1)-75(48), the feedback signals 225 are broadcast signals that inform all of the ingress port subsystem 75(1)-75(48) of the status of the subject egress buffer(s) 65. These signals are broadcast in the reverse direction of the packet traffic and share the bandwidth on some of the uplinks 42 and downlinks 44 so that the message can be sent backwards to the ingress stage 15. In certain examples, there may be separate broadcast mechanisms in each of the egress stage 25 and the crossbar switching fabric 20 that collectively operate to provide the feedback signals 225 to all ingress port subsystems 75(1)-75(48).

In certain examples, when the egress stage 25 transmits the Xon signal 225, the signal will be received simultaneously by all ingress port subsystems 75(1)-75(48). If many of the ingress port subsystems 75(1)-75(48) have traffic queued for transmission, the arrival of the Xon signal 225 could synchronize a flood of packets. This flood of traffic could result in many collisions and wasted effort. To avoid this flood of traffic, the arrival of the Xon signal 225 may be deliberately delayed at each ingress port subsystem by a random amount. This random delay also ensures that, over time, all ingress ports receive equal access to any egress port.

Multicast traffic, by default, does not use the Xon/Xoff control loop, although the control loop can be configured for use with multicast traffic. Rather, with multicast traffic, a count is maintained of the amount of buffer space used by each egress port. If the buffer usage of an egress port exceeds a threshold, then no more multicast packets will be copied to that port until the usage drops below the threshold.

As described above, the crossbars 55(1)-55(4) of the crossbar switching fabric 20 have no buffering. Thus, if more packets arrive for a particular downlink 44 than the number of channels on that downlink 44, some packets will be rejected (i.e., negative acknowledgement issued to ingress stage 15). In certain examples, buffers may be included in the crossbars 55(1)-55(4) that are only used when the number of packets received for a specific downlink 44 exceeds the channels available on that downlink 44.

In such examples, if a unicast packet arrives at a crossbar 55(1) for which there is no available channel on the identified downlink 44, the packet will enter the buffer associated with that crossbar 55(1). The packet will wait in the buffer for a predetermined time period. During this time period, the tail of the packet continues to arrive and is stored in the buffer. If, during the time period, a channel becomes free on the identified downlink 44, and it is offered to the packet in the buffer, the packet is read out of the buffer onto the channel. If the time period expires without a channel on the identified downlink being offered, then a negative acknowledgement is issued and the content of the buffer is discarded. This reduces the number of negative acknowledgements that need be issued and hence improves the performance.

In such examples, each of the ingresses of the crossbars 55(1)-55(4) would have such a buffer. Also, in order to reduce wasted effort, only a single buffer may be permitted to wait for a channel to become free on each downlink 44. The first buffer to request a channel on a busy downlink 44 has its request accepted while further requests are immediately rejected and a negative acknowledgement is issued.

This variation can also be extended to multicast traffic. If downlink channels are not available for all of the requested branches in a multicast packet, the packet would wait in the buffer and continue to collect branches as channels become available. When the timer expires, the packet is transmitted on all channels that it has collected.

Figure 5:
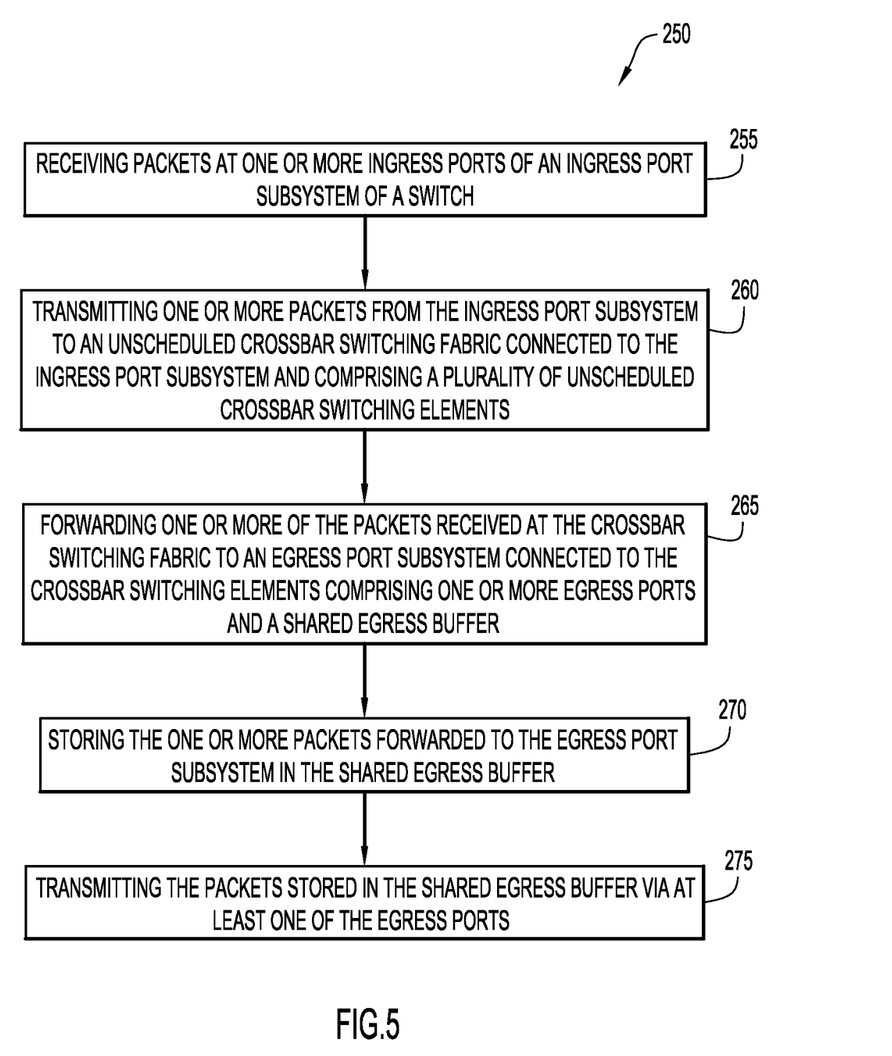
FIG. 5 is a high-level flowchart of a method in accordance with examples presented herein.

FIG. 5 is a high-level flowchart of a method 250 in accordance with examples presented herein. Method 250 begins at 255 where packets are received at one or more ingress ports of an ingress port subsystem of a switch. At 260, one or more packets are transmitted from the ingress port subsystem to an unscheduled crossbar switching fabric connected to the ingress port subsystem that comprises a plurality of unscheduled crossbar switching elements. At 265, one or more of the packets received at the crossbar switching fabric are forwarded to an egress port subsystem connected to the crossbar switching elements. The egress port subsystem comprises a plurality of egress ports and a shared egress buffer. At 270, the one or more packets forwarded to the egress port subsystem are stored in the shared egress buffer. At 275, the packets stored in the shared egress buffer are transmitted via at least one of the egress ports.

As noted above, presented herein is a network switch that uses an unscheduled crossbar switching fabric that imposes no scheduling latency on packets arriving at the switching fabric. As a result, of the unscheduled nature of the switching fabric, collisions can occur within the switching fabric. Collisions are handled by notification and retransmission. Additionally, the switch third stage does not include crossbars (as in conventional designs), but rather one or more shared memory devices. Shared memory devices support multiple simultaneous packet arrivals eliminating packet collisions in the third stage. The combination of an unscheduled crossbar switching fabric with a shared memory final stage enables us to achieve low-latency in a design that scales up to large switch implementations.

The above description is intended by way of example only.

What is claimed is:

1. An apparatus comprising:
an ingress stage that includes a plurality of ingress port subsystems each comprising a plurality of ingress ports that receive packets;
an unscheduled crossbar switching fabric connected to the ingress stage and comprising a plurality of crossbar switching elements that receive one or more packets from at least one of the ingress port subsystems; and
an egress stage connected to the unscheduled crossbar switching fabric, wherein the egress stage includes a plurality of egress port subsystems each comprising:
a memory comprising at least one shared egress buffer that receives any packets forwarded by the crossbar switching elements from the ingress stage directed to the egress port subsystem, and
a plurality of egress ports that transmit the packets received in the shared egress buffer,
wherein a first crossbar switching element generates a negative acknowledgement message for transmission to a first ingress port subsystem when a first packet received from the first ingress port subsystem cannot be forwarded to the egress stage, and wherein the first ingress port subsystem is configured to randomly select a second crossbar from among the plurality of crossbar switching elements that are not the first crossbar switching element and to retransmit the first packet to the second crossbar switching element for forwarding to the egress stage after receipt of the negative acknowledgement message.

2. The apparatus of claim 1, wherein the unscheduled crossbar switching fabric is an unbuffered crossbar switching fabric.

3. The apparatus of claim 1, wherein the shared egress buffer is configured such that an entire bandwidth of packets received substantially simultaneously from the crossbar switching elements may be directed towards one single egress port.

4. The apparatus of claim 1, wherein the first crossbar switching element generates a positive acknowledgement message for transmission to the first ingress port subsystem when the first packet received from the first ingress port subsystem is forwarded to the egress stage.

5. The apparatus of claim 1, wherein the egress stage comprises a feedback control mechanism that transmits a first feedback signal to the ingress stage when the egress buffer becomes substantially filled with packets, wherein the first feedback signal causes the ingress stage to cease transmission of packets to a specified egress port on a specified traffic class.

6. The apparatus of claim 5, wherein the feedback control mechanism is an on/off feedback control mechanism configured to transmit a second feedback signal to the ingress stage when the egress buffer becomes substantially empty, wherein the second feedback signal causes the ingress stage to re-commence transmission of packets to the specified egress port on the specified traffic class.

7. The apparatus of claim 1, wherein the crossbar switching elements each include a buffer that temporarily stores a packet only when a packet received at the crossbar cannot be forwarded to the egress stage.

8. A method comprising:
receiving packets at one or more ingress ports of an ingress port subsystem of a switch;
transmitting one or more packets from the ingress port subsystem to an unscheduled crossbar switching fabric connected to the ingress port subsystem and comprising a plurality of unscheduled crossbar switching elements;
forwarding one or more of the packets received at the crossbar switching fabric to an egress port subsystem connected to the crossbar switching elements comprising one or more egress ports and a shared egress buffer;
storing the one or more packets forwarded to the egress port subsystem in the shared egress buffer;
transmitting the packets stored in the shared egress buffer via at least one of the egress ports;
generating, with a first unscheduled crossbar switching element, a negative acknowledgement message for transmission to the ingress port subsystem when a first packet received from the ingress port subsystem cannot be forwarded to the egress port subsystem;
randomly selecting a second unscheduled crossbar switching element from among the plurality of unscheduled crossbar switching elements that are not the first unscheduled crossbar switching element; and
after receipt of the negative acknowledgement message at the ingress port subsystem, retransmitting, by the ingress port subsystem, the first packet to the second unscheduled crossbar switching element for forwarding to the egress port subsystem.

9. The method of claim 8, further comprising:
substantially simultaneously forwarding a plurality of packets to the egress port subsystem that are all directed towards a single egress port of the egress port subsystem; and
storing all of the plurality of packets directed towards the single egress port in the shared buffer.

10. The method of claim 8, further comprising:
generating, with the first unscheduled crossbar switching element, a positive acknowledgement message for transmission to the ingress port subsystem when the first packet received from the ingress port subsystem is forwarded to the egress port subsystem.

11. The method of claim 1, wherein the egress port subsystem comprises a feedback controller and further comprising:
transmitting a first feedback signal to the ingress port subsystem when the shared egress buffer becomes substantially filled with packets; and
in response to receipt of the first feedback signal at the ingress port subsystem, ceasing transmission of packets to the unscheduled crossbar switching fabric to a specified egress port on a specified traffic class.

12. The method of claim 11, wherein transmitting a first feedback signal to the ingress port subsystem comprises:
transmitting a broadcast message for simultaneous forwarding to a plurality of ingress port subsystems.

13. The method of claim 11, further comprising:
transmitting a second feedback signal to the ingress port subsystem when the shared egress buffer becomes substantially empty; and
in response to receipt of the second feedback signal at the ingress port subsystem, re-commencing transmission of packets to the unscheduled crossbar switching fabric to the specified egress port on the specified traffic class.

14. The method of claim 8, wherein the crossbar switching elements each include a crossbar buffer and further comprising:
temporarily storing a packet in a crossbar buffer only when a packet received at the crossbar cannot be forwarded to the egress port subsystem.

15. An apparatus comprising:
one or more ingress port subsystems each comprising one or more ingress ports that receive packets;

a plurality of unscheduled crossbar switching elements connected to the ingress port subsystems that receive one or more packets from at least one of the ingress port subsystems; and one or more egress port subsystems each comprising:
a memory comprising at least one shared egress buffer that receives any packets forwarded by the crossbar switching elements from the ingress port subsystems directed to the egress port subsystem, and
one or more egress ports that transmit the packets received in the shared egress buffer, wherein a first crossbar switching element generates a negative acknowledgement message for transmission to a first ingress port subsystem when a first packet received from the first ingress port subsystem cannot be forwarded to an egress port subsystem, and the first ingress port subsystem is configured to randomly select a second crossbar switching element from among the plurality of crossbar switching elements that are not the first crossbar switching element and to retransmit the first packet to the crossbar switching element for forwarding to the egress port subsystem after receipt of the negative acknowledgement message.

16. The apparatus of claim 15, wherein the unscheduled crossbar switching elements are unbuffered crossbar switching elements.

17. The apparatus of claim 15, wherein the shared egress buffer is configured such that an entire bandwidth of packets received substantially simultaneously from the crossbar switching elements may be directed towards one single egress port.

18. The apparatus of claim 15, wherein the first crossbar switching element generates a positive acknowledgement message for transmission to the first ingress port subsystem when the first packet received from the first ingress port subsystem is forwarded to the egress port subsystem.

* * * * *